(12) United States Patent
Thomire

(10) Patent No.: US 6,422,370 B1
(45) Date of Patent: Jul. 23, 2002

(54) HYDRAULICALLY CONTROLLED CLUTCH RELEASE DEVICE

(75) Inventor: Sylvain Thomire, Levallois (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/647,295

(22) PCT Filed: Jan. 27, 2000

(86) PCT No.: PCT/FR00/00186

§ 371 (c)(1), (2), (4) Date: Sep. 28, 2000

(87) PCT Pub. No.: WO00/45061

PCT Pub. Date: Aug. 3, 2000

(30) Foreign Application Priority Data

Jan. 29, 1999 (FR) .............................................. 99 01007

(51) Int. Cl.[7] .............................................. F16D 25/08
(52) U.S. Cl. .............................. 192/85 CA; 192/91 A; 277/630; 277/637; 277/928
(58) Field of Search ........................ 192/85 CA, 91 A; 92/107; 277/628, 630, 637, 641, 642, 910, 928

(56) References Cited

U.S. PATENT DOCUMENTS

| | | | |
|---|---|---|---|
| 4,557,506 A | | 12/1985 | Hanks et al. |
| 5,609,233 A | * | 3/1997 | Villata ....................... 192/91 A |
| 5,779,019 A | * | 7/1998 | Grosspietsch et al. .... 192/85 C |
| 5,964,333 A | * | 10/1999 | Grosspietsch et al. .. 192/85 CA |
| 6,016,898 A | * | 1/2000 | Duquesnes ................. 192/85 R |
| 6,019,204 A | * | 2/2000 | Meyer ..................... 192/85 CA |
| 6,167,995 B1 | * | 1/2001 | Lindner ..................... 192/3.57 |
| 6,283,266 B1 | * | 9/2001 | Welter et al. ............. 192/85 R |

FOREIGN PATENT DOCUMENTS

| | | |
|---|---|---|
| DE | 34 14648 A1 | 10/1985 |
| DE | 43 31 728 A1 | 3/1994 |
| JP | 57-195925 A * | 12/1982 ............ 192/85 CA |

* cited by examiner

Primary Examiner—Richard M. Lorence
(74) Attorney, Agent, or Firm—Liniak, Berenato, Longacre & White (57) ABSTRACT

The clutch release device comprises an outer body (32), a mock cavity (36) that is radially defined on the outside by an outer tube (68) comprising a liquid feed inlet (42) for a chamber (36) that is joined to a feed pipe which communicates with a bore hole (72) pertaining to the outer body (32), whereby the orientation thereof is generally radial and the location thereof is opposite an feed inlet (42) for the outer tube, via an added tight tubular element (79) that is mounted in the bore hole (70); the radially outer end (102) of the tubular element (78) is also mock and the feed duct (26) is connected to a hole (100) in the outer body (32, 94) that discharges transversally into the bore hole (72) to the right of a passage (108) that is formed in the wall (106) of the tight tubular element (78).

20 Claims, 7 Drawing Sheets

HYDRAULICALLY CONTROLLED CLUTCH RELEASE DEVICE

BACKGROUND OF THE INVENTION

1. Field of the Invention

The present invention relates to a declutching device for a clutch, in particular for a mechanical diaphragm clutch for a motor vehicle.

More particularly, the invention relates to a declutching device for a clutch, for acting on a clutch disengagement means, especially for a mechanical clutch for a motor vehicle, and comprising an external body for fastening the declutching device on a fixed part, an axially oriented annular blind cavity defined by a guide tube which is delimited radially outwardly by an outer tube, the guiding profile of which is followed by the external body, and further comprising a piston which penetrates into the blind cavity so as to define a variable volume control chamber, and of the type in which the outer tube includes an orifice for feeding fluid to the chamber, which is connected to a feed duct that is in communication, with a bore of the external body the orientation of which is generally radial and which is formed facing the feed orifice of the outer tube, through a tubular element sealingly attached to and mounted in the bore.

2. Description of Related Art

Figure 1:
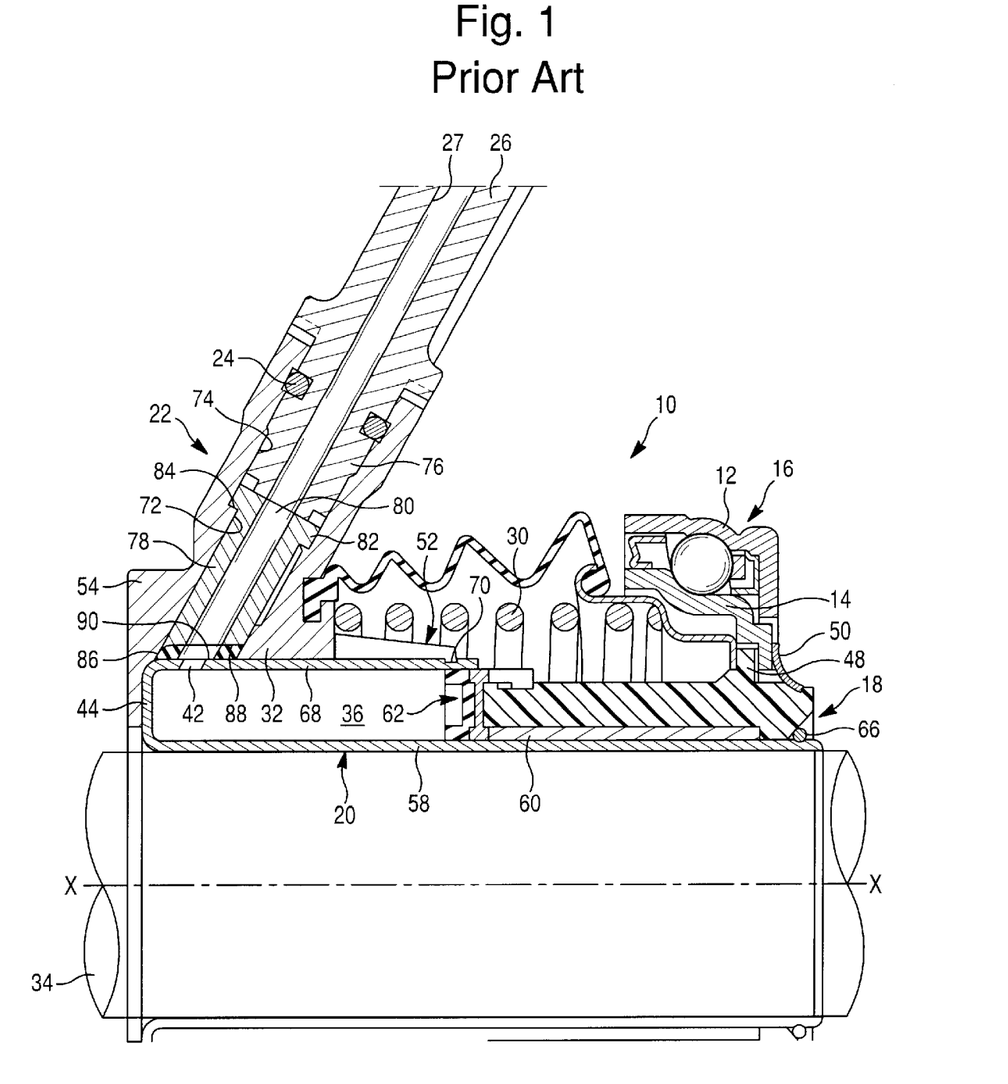
FIG. 1 is a partial view in longitudinal axial cross section, of a hydraulic declutching device in the state of the art, which is shown in the clutch disengaged position.
Figure 2:
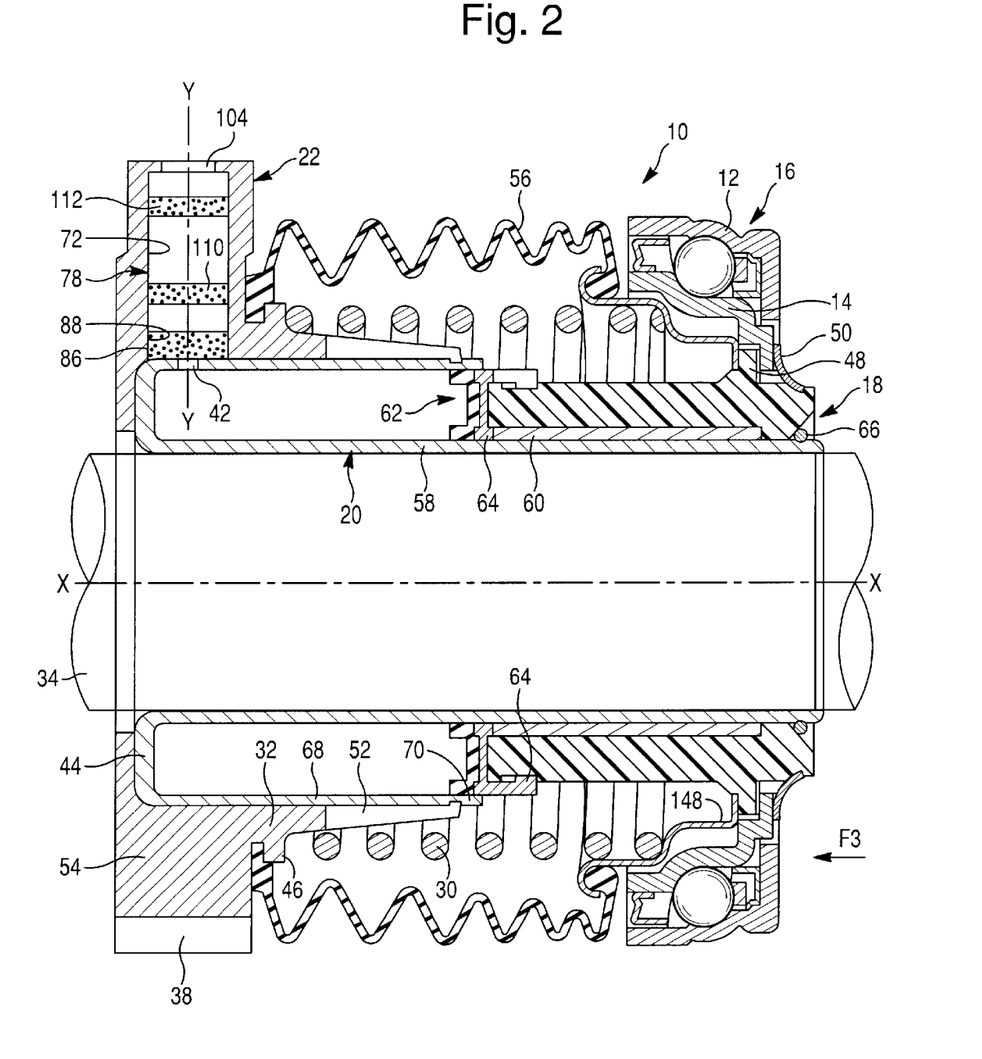
FIG. 2 is a view similar to that in FIG. 1, and shows a first embodiment of a device in accordance with the features of the invention, with its sealing cartridge shown in outside view.

Such a declutching device, with hydraulic control obtained by means of the piston, is described and shown in French patent application No. 98 07970 filed on Jun. 19, 1998, and also in FIG. 1 attached to the present description.

In that document, in order to provide good sealing between the external body and the outer tube around the fluid feed orifice of the chamber, the tubular sealing element is interposed axially in the bore between the outer tube, with a sealing gasket being interposed, and the end of a connecting duct which is itself connected sealingly on the external body.

SUMMARY OF THE INVENTION

An object of the invention is to propose a declutching device of the type set forth above in which the various sealing means are more effective, and the design of which enables improved modularity of the components to be obtained, in particular with a view to having a range of hydraulically controlled declutching devices at reduced cost, so as, in particular, to facilitate the geometric disposition of the connecting duct with respect to the external body.

With this in view, the invention proposes a device characterised in that the radially outer end of the tubular element is blind, and in that the feed duct is connected to a through hole of the external body which is open transversely into the bore in line with a passage formed in the wall of the tubular sealing element.

This feature simplifies the management of the seals between the external body and the outer tube on the one hand, and between the feed duct and the external body on the other hand, and makes them independent while permitting the disposition and orientation of the feed duct and its connecting through hole, independently of the orientation and position of the bore and of the attached tubular sealing element.

In addition, the tubular sealing element is in the form of a sealing "cartridge", the conditions for the manufacture and sealed fitting of which are improved.

In accordance with further features of the invention:

- the tubular sealing element carries at least one annular seal which is in cooperation with the wall of the bore;
- the annular seal is disposed between the said passage and the radially inner end of the tubular sealing element, thus ensuring complementary sealing between the chamber and the external body;
- the tubular sealing element carries a second annular seal disposed between the said passage and the radially outer end of the tubular sealing element, completing the seal between the sealing cartridge and the bore in which it is sealingly mounted;
- an annular sealing gasket is mounted in compression between the radially inner transverse annular end face of the tubular sealing element and a facing portion of the outer wall of the outer tube that surrounds the feed orifice, and which avoids leakages of liquid between the outer tube and the external body;
- the annular sealing gasket is an element which is fitted between the radially inner transverse annular end face of the tubular sealing element and the facing portion of the outer wall of the outer tube, or, in another version, the annular sealing gasket is made by moulding in one piece with the tubular sealing element, in particular by a two-material injection moulding technique;
- the passage is at least one hole formed in the wall of the tubular sealing element, in order to put the interior of the tubular sealing cartridge into communication with its periphery or outer wall;
- the tubular sealing element has an internal radial groove into which the said hole is open, thereby permitting various orientations and positions of the connecting through hole, by using the same cartridge and arranging it so that the angular orientation of the cartridge in its bore does not matter;
- the tubular sealing element is immobilised axially in the bore which receives it, by fastening means which are arranged at the radially outer end of the bore, so as to retain it axially within the bore by axially compressing the annular seal and, where appropriate, providing additional sealing in the region of the fastening means;
- the fastening means comprise a radial abutment shoulder formed within the bore, which extends facing the radially outer annular transverse axial end face of the tubular sealing element;
- the shoulder is formed integrally with the body, in particular by deformation of the latter after the tubular sealing element has been fitted in place;
- the abutment shoulder is an annular ring attached within the bore;
- the tubular sealing element is immobilised axially, in the bore which receives it, by sealed welding, in particular with external application of heat from its radially outer end portion into the corresponding portion of the bore;
- the tubular sealing element is immobilised axially, in the bore which receives it, by sealed adhesive bonding of its radially outer end portion in the corresponding portion of the bore;
- the tubular sealing element is immobilised axially, in the bore that receives it, by screw-fastening of its radially outer end portion in the corresponding portion of the bore;
- the tubular sealing element is immobilised axially by force-fitting in the bore that receives it;
- the tubular sealing element is immobilised axially, in the bore that receives it, by complementary fastening means with elastic mating engagement;
- the tubular sealing element is immobilised axially, in the bore that receives it, by complementary fastening means defining a cotter pin;

the body is a plastics moulding;

the outer tube is a metal tube;

the tubular sealing element is a plastics moulding.

BRIEF DESCRIPTION OF THE DRAWINGS

Further features and advantages of the invention will appear on a reading of the following detailed description, for an understanding of which, reference will be made to the attached drawing in which.

DETAILED DESCRIPTION OF PREFERRED EMBODIMENT

In the following description, those components which are identical, similar or analogous to each other are designated by the same reference signs.

FIG. 1 shows a hydraulically controlled declutching device 10 for a clutch which, in this example, is a motor vehicle mechanical diaphragm clutch of the kind which is described as to its method of operation in, for example, the document FR-A-2 730 532.

The embodiment shown in FIG. 1 corresponds to the design in accordance with the state of the art as established by French patent application No. 98 07970 filed on Jun. 19, 1998, the contents of which are considered as being incorporated in the present description.

The diaphragm of the clutch (not shown) accordingly constitutes the disengaging means of the clutch on which the actuating element 12 of the declutching device is arranged to act.

The actuating element 12 consists in this example of the rotating outer ring of a ball bearing. This ring 12 is so configured that, in this case, it exerts a thrust on the inner end of the fingers of the diaphragm.

The inner ring 14 of the rolling bearing is fixed against rotation, with balls being interposed between the rings 12, 14. The rings 12, 14 in this example are metal pressings.

It is of course possible to reverse the structures, with the outer ring of the rolling bearing being fixed against rotation while the inner ring of the rolling bearing therefore rotates.

For more details, reference should be made for example to the document FR-B-2 730 532 mentioned above.

Thus, the rotating ring may be either of curved or flat cross section so as to make point contact with the fingers of the diaphragm.

The assembly consisting of the rotating ring 12, the fixed ring 14, usually referred to as the clutch release bearing 16, is in this example arranged to act in a thrust mode on the diaphragm.

The release bearing 16 is subjected to the action of a control member which in this example is a piston 18 mounted for axial movement along a metal tube guide 20, also referred to as a guide tube. The release bearing 16 is arranged to act on the disengaging device of the clutch and is carried by the piston 18.

More precisely, the hydraulic declutching device 10 shown in FIG. 1 is a hydraulically controlled declutching device of the concentric type.

This hydraulic declutching device constitutes the hydraulic receiver of a hydraulic clutch control system. The control fluid may be liquid or may consist of compressed air. In all cases the control system is called a hydraulic control system.

The device includes an inlet 22, which in this example is generally tubular in form and which is inclined with respect to the axis X-X of sliding movement of the piston 18, on which is connected, in this example releasably with the aid of a spring clip 24, a duct 26 which is connected to the outlet of a master cylinder (not shown), controlled by the clutch pedal, or in another version controlled by an actuator which includes an electric motor connected to a computer which governs the electric motor in accordance with predetermined programs so as to carry out the declutching operation. The master cylinder consists of a piston and a variable volume hydraulic control chamber. The same is true for the receiver, that is to say the declutching device in accordance with the invention.

In the known way, when for example the driver acts on the clutch pedal, the piston of the master cylinder is displaced axially so as to expel control fluid to the receiver and pressurise the hydraulic control chamber of the receiver.

In that case, the volume of the said chamber increases and the clutch release bearing 16 is, with the piston 18, displaced towards the right as seen in FIG. 1. In this case, the diaphragm pivots and releases its action on the pressure plate of the clutch so as to release the friction disc of the clutch.

When the driver releases the clutch pedal, the piston of the master cylinder reverts to its initial position, and the same is true for the piston 18.

The control chamber is then depressurised, its return being effected by the action of the diaphragm exerting a thrust on the clutch release bearing 16 and the piston 18 towards the left in FIG. 1. The clutch is now engaged.

A preloading spring 30 is provided for maintaining the rotating ring 14 in permanent engagement on the diaphragm.

The spring 30 works axially between the external body 32 and the piston 18. This spring 30 is compressed when the clutch is engaged and is relaxed when the clutch is disengaged (FIG. 1).

It will be recalled that, when the clutch is engaged, a torque is transmitted from the engine of the vehicle to the input shaft 34 of the gearbox. When the clutch is disengaged, no torque is transmitted, given that the friction disc of the clutch is mounted in rotation on the shaft 34, being arranged to be gripped between the pressure plate and reaction plate of the clutch under the action of the diaphragm. All of this is well known, and is for example described in the document FR-A-2 730 532. The clutch apparatus may of course include declutching levers which work on coil springs. It may consist of a false diaphragm acting on a Belleville ring.

In this example, the control fluid is oil, though in another version it may be compressed air, and it is therefore in the interests of simplicity that the declutching device according to the invention will be referred to as a declutching device which is hydraulically controlled.

This device is of the concentric type because it is arranged for a shaft, in this example the shaft 34 of the gearbox shown in phantom lines in FIG. 1, to extend through it.

The device accordingly has an axial axis of symmetry X-X, with the tube guide 20 surrounding the input shaft 34.

As mentioned above, the device has a variable volume hydraulic control chamber delimited by the piston 18, which is mounted for axial movement along the tube guide 20.

The chamber is also delimited by an axially oriented blind annular cavity 36 which is arranged to be supplied with fluid under pressure from the tubular inlet 22, which exhausts into the cavity 36 in the vicinity of the base of the latter. The cavity 36 therefore serves as a receptacle for the control fluid and for the piston 18, and more precisely it receives the seal of the latter. The piston 18 therefore penetrates into the cavity 36.

The cavity 36 is provided with an orifice 42, and it is delimited at the rear end by its base 44 and is closed sealingly at the front end by the piston 18.

The cavity 36 is defined by the tube 20 so as to reduce cost. The tube guide 20 is fixed to the body 32 which is of generally tubular form. The tube 20 includes an inner tube 58 which is joined through the base 44, oriented generally transversely, to an outer tube 68 which is shorter in the axial direction than the tube 58. The tube is for example made by deep drawing from a slug.

The body 32 is fixed to the tube guide 20 and, with the latter, it constitutes the so-called fixed part of the hydraulic declutching device.

The body 32 is so configured that it can be secured on a fixed wall, which in this example is the front wall of the casing of the clutch or the casing of the gearbox of the vehicle.

For example, as is described in the document FR-A-2 753 505, a sole plate is attached on the fixed wall of the vehicle, and a bayonet type fastening means is interposed between the external body 32 and the sole plate.

In this example the body 32 has ears 38 (see FIG. 3), which cannot be seen in FIG. 1, for fastening it by means of screws on the fixed wall of the vehicle, in the manner described in the document FR-A-2 730 532.

In general terms the body is fitted directly or indirectly on a fixed part of the vehicle.

The body is made of mouldable material, for example an aluminium based or plastics material.

In this example the body 32 is of mouldable plastics material and the inlet 22 is moulded integrally with the body 32.

The body 32 surrounds the tube guide 20 which is mounted within the body 32. The body 32 is accordingly a body which is external to the tube guide 20, which constitutes an inner tube. The body 32 and the tube 20 are mounted concentrically, with the same axis X-X of axial symmetry.

More precisely, the body 32 surrounds the outer tube 68 and it follows the form of the base 44 so as to prevent axial movement of the tube 20 in one direction.

The tube guide 20 is longer axially than the body 32 and accordingly projects axially with respect to the body 32, in this example externally with a stepped diameter so as to define an abutment shoulder 46 for the rear axial end of the preloading spring 30, the other end of which (that is to say the front end) bears on the rear face of a generally transversely oriented collar portion 48, by which the thickness of the piston 18 is enlarged at its free front end.

The front face of the collar portion 48 serves as an abutment for the inner sleeve 14, and more precisely for an inner radial flange of the sleeve 14 formed at its inner periphery. An axially acting spring 50 holds the internal radial flange in contact with the collar portion 48. This spring 50 bears on a shoulder, not given a reference numeral, formed on the piston 18 at its front end. The sleeve 14, and therefore the rolling bearing or release bearing 16, is displaceable radially into contact with the collar portion 48 under the control of the spring 50, which in this example is in the form of a Belleville ring.

The clutch release bearing 16 therefore centres itself automatically. In another version, the release bearing is force-fitted on the piston 18 and then does not have the automatic centring facility. In all cases, the release bearing 16 is attached axially to the piston 18.

The preloading spring 30 surrounds the front end 52 of the body 32 having the smaller diameter, the rear end portion 54 of the body 32, which has the larger diameter, having the ears 38 for fastening it to, the fixed wall of the vehicle. The inlet 22 is formed integrally by moulding with the rear end portion 54.

A protective bellows is provided. This bellows 56, which is made of an elastomeric material such as rubber, surrounds the preloading spring 30 and has beads at each of its ends which are mounted within grooves formed in the end portion 54 and in a stepped tube 148 fixed with respect to the piston 18.

The piston 18, which is of tubular form made as a moulding in plastics material, is guided in axial sliding movement along the outer periphery of the tube guide 20, which in this example is of metal, and more precisely along the inner tube 58 of the tube guide 20.

The piston 18 includes at its inner periphery a tube 60. The tube 60 is fixed to the piston 18 and is in intimate contact at its inner periphery with the outer periphery of the tube 58.

The material of the tube 50 is so chosen as to have good sliding properties.

The piston 18 carries the actuating element 1 4 at its free front end as described earlier herein.

At its rear end the piston 18 carries a dynamic seal 62 which sealingly closes the blind cavity 36 and therefore the variable volume chamber defined by the piston 20 and the cavity 36. This seal 62 has lips and is fixed to the rear face of a coupling piece 64 of plastics material.

This piece 64 attaches the lip seal 62 axially on the piston 18, by snap-fitting in this example, and it permits axial movement of the piston with respect to the seal 62.

The inner guide tube 58 has at its front end a groove for receiving a circlip 66 that constitutes an axial abutment for the piston 18 and prevents the seal 62 from escaping from the cavity 36. In addition, it enables an assembly to be formed, before being fitted on the vehicle, that is able to be handled and transported, the piston 18 being prevented from escaping by the preloading spring 30.

The bellows 56 prevents the blind cavity 36 from being contaminated by pollutants.

The hydraulic control device according to the state of the art is inexpensive and light in weight. It enables the blind cavity 36 to be standardised and the body 32 to be adapted for different kinds of fitting on the vehicle. This solution enables the number of seals to be reduced.

This is due to the fact that the blind cavity 36 is formed in the guide tube 20 or tube guide.

The piston 18, with its seal 62 and the coupling piece 64, are displaced sealingly because of the seal 62, within the cavity 36 which is pressurised through the orifice 42, which is located axially between the base 44 and the seal 62 when the clutch is engaged.

The orifice 42, formed in the outer tube 68 which is coaxial with the inner tube 58, is open into the minimum reserve volume of the variable volume chamber defined within the blind cavity 36 and delimited by the piston 18 which is movable axially with respect to the body 32 and the fixed guide tube.

The outer tube 68 has at its front end a groove 70 for cooperation with the front end of the body 32, and more precisely for receiving spigots or notches formed in elastic lugs of the end portion 52.

The tube 20 is prevented from rotating with respect to the body 32 by means of lugs projecting from the inner periphery of the front end of the body 32, the said lugs penetrating into hollow recesses formed at the front end of the outer tube 68. The outer tube therefore has hollow elements to prevent it from rotating with respect to the body. In another version, the hollow elements are replaced by projecting elements.

The tube 20 may be snap-fitted in the body 32 because the front end of the body is thin.

In this way, the tube 20 can be fitted axially and telescopically within the body until the lugs engage in the recesses. The tube 20 is then prevented from moving axially by the elastic lugs of the end portion 52 which are engaged in the groove 70 in the tube 68, and by the base of the body 32 in cooperation with the base 44 of the tube 20.

By way of variation, the external body 32 may be formed by in situ moulding around the tube guide 20.

In the embodiment according to the state of the art shown in FIG. 1, the inlet 22 is a tubular portion which is formed integrally by moulding with the external body 32.

The tubular inlet 22 has an internal stepped bore, the radially innermost portion 72 of which, being of small diameter, is open radially inwards in line with the feed orifice 42, and is extended by the radially outer portion 74, of larger diameter, which receives the free end portion 76 of the duct 26, which is of complementary form and dimensions.

A tubular sealing element 78 is mounted in the portion 72 of the bore in the inlet 22.

The tubular element 78 has a coaxial channel 80 which in this example is open at both ends, and it includes at its radially outer end a collar portion 82 which bears axially against the shoulder 84 that joins the two portions 72 and 74 of the bore in the inlet 22.

An annular sealing gasket 86 surrounds the feed orifice 42, and is interposed axially between the radially inner annular end face 88 of the tubular sealing element 88 and the facing portion 90 of the outer peripheral surface of the outer tube 68 that surrounds the orifice 42. A further sealing gasket is interposed between the end of the duct 26 and the collar portion.

The annular sealing gasket 86, which is of elastomeric material, is mounted in compression between the surfaces 88 and 90 so as to give a good seal between the external body 32 and the outer tube 68 around the hole 42, the gripping force applied to it being determined by the cooperation of the surfaces 82 and 84.

The sealing gasket 86 may be an attached element which is positioned before introduction of the tubular element 88, or in another version, it may be formed integrally with the body of plastics material of the tubular sealing element 78, by moulding using the two-material injection moulding technique.

It is possible to provide means, not shown, for preventing the tubular sealing element 88 from rotating about its axis with respect to the tubular inlet 22.

The internal duct 80 in the tubular element 78 extends axially in the extension of the internal duct 27 of the duct 26 when the latter is fitted in position as shown in FIG. 1.

As can be seen in FIG. 1, the assembly consisting of the inlet 22 and the duct 26 is inclined axially with respect to the axis X-X towards the right, which in particular makes it necessary to configure the bellows 56 in a frustoconical form.

In the design shown in FIG. 1, each time it is desired to modify the position and orientation of the inlet 22 and therefore the duct 26, with respect to the external body 32, this modifies both the form and the position of the tubular element 78, especially in the region of its radially inner end 88, the inclination of which, with respect to the axis of the components 78, depends on the inclination of the inlet 22. In addition, the gasket 86 is not gripped by a uniform amount.

The first embodiment of the invention, which provides a remedy for these drawbacks, will now be described with reference in particular to FIGS. 2 to 5.

As can be seen in these Figures, the inlet 22 is functionally and structurally independent of the means for fastening and connecting the duct 26.

It can therefore be seen that the inlet 22 extends in this example in a radial direction, that is to say its axis Y-Y is at right angles to the axis X-X, while the body 32 includes an end piece 94 which is moulded integrally to permit fastening of the duct 26, which in this example is received in an internal hole 96 in the end piece 94, to which it is fixed with a fastening means 98 in elastic mating relationship.

Figure 3:
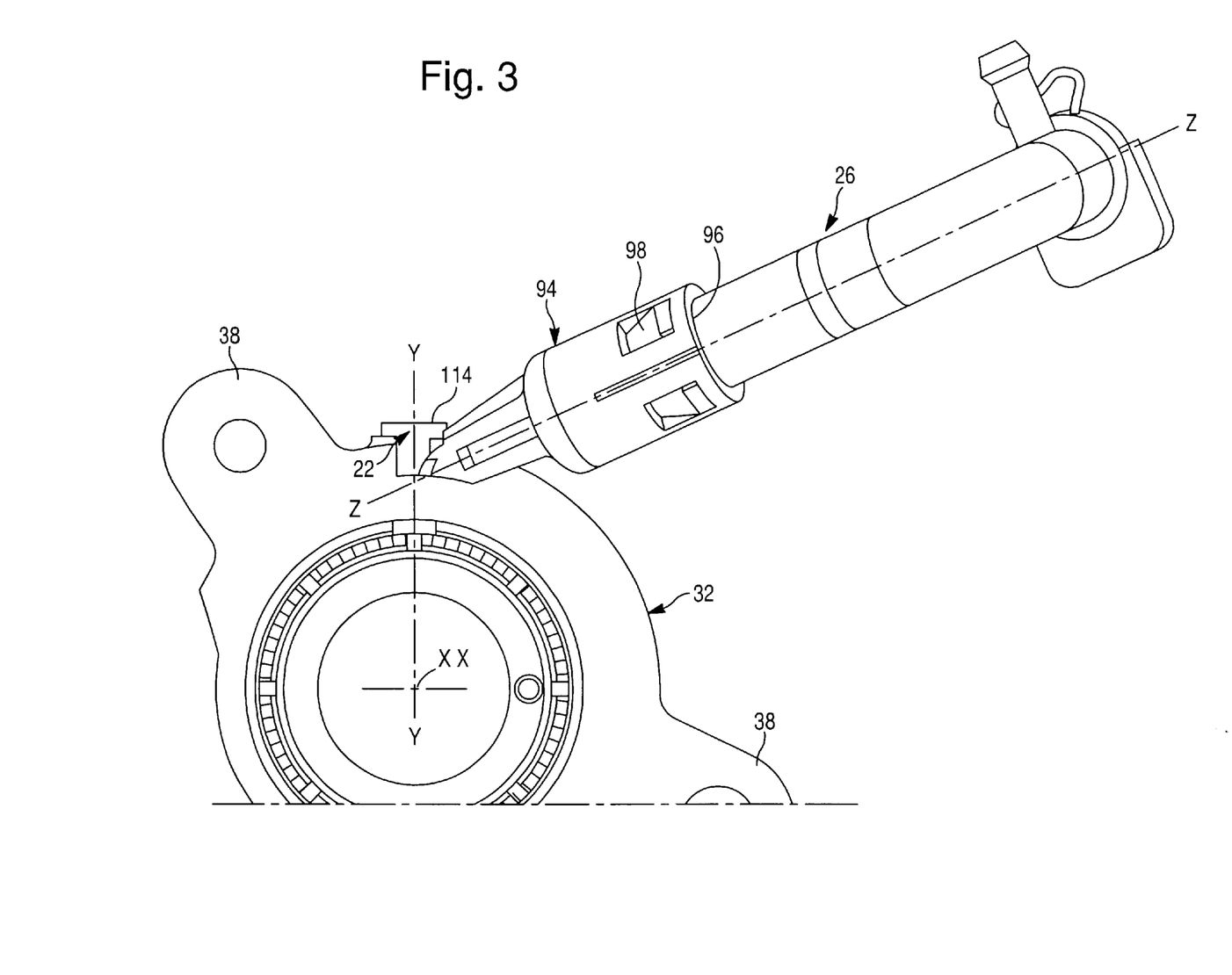
FIG. 3 is a partial outside view in the direction of the arrow F3 in FIG. 2.
Figure 4:
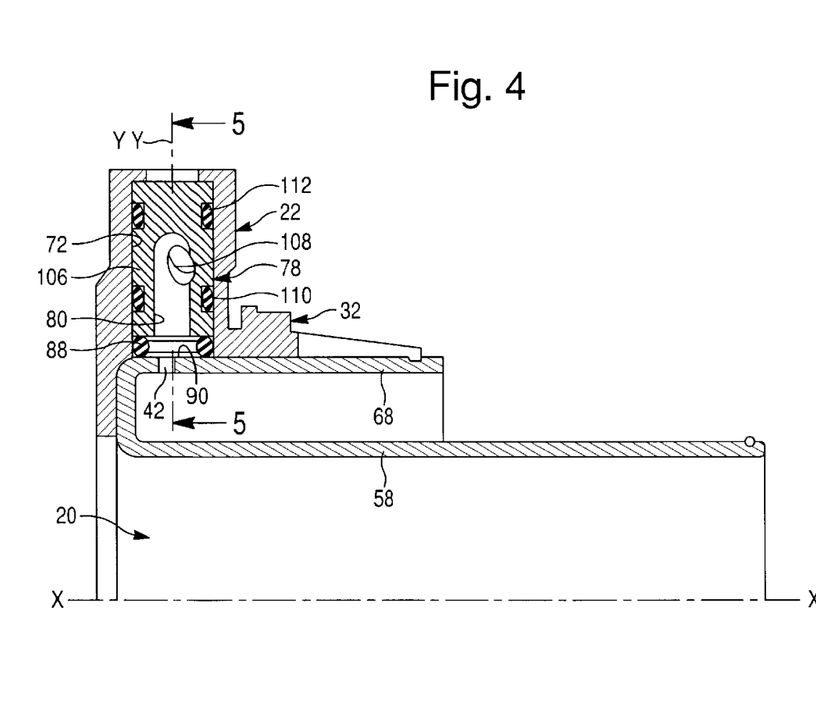
FIG. 4 is a view similar to that in FIG. 2, but shows the main components of the invention with the sealing cartridge in cross section.
Figure 5:
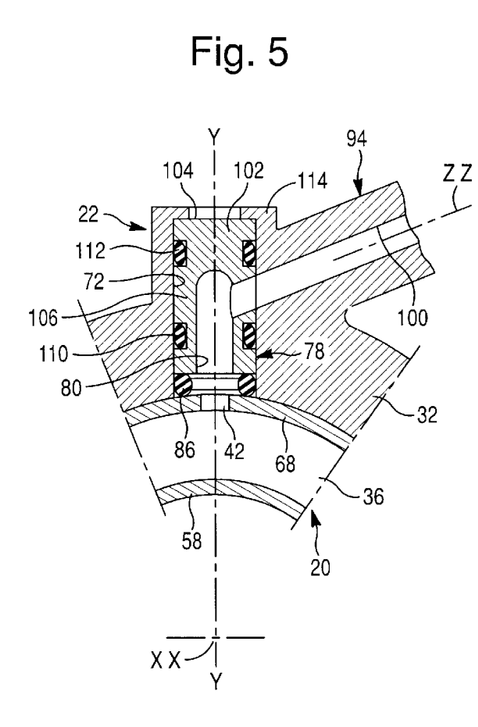
FIG. 5 is a partial view in cross section taken on the line 5—5 in FIG. 4.

As can be seen in FIGS. 3 and 5, the end piece 94 extends transversely, and is inclined with respect to the axes X-X, Y-Y, and its axial through hole 100 which extends the duct 27 of the connecting pipe 26, is open transversely within the bore 72 of the inlet 22 in the general direction Z-Z of the end piece 94.

The tubular sealing element 78 in this example is, in accordance with the features of the invention, a blind sealing cartridge, that is to say it is closed at its radially outer end by a base portion 102 delimited by a transverse wall 104 in the form of a disc.

Thus the duct 80 is obturated at its radially outer end while being open radially inwards in line with the feed orifice 42 formed in the outer tube 68 of the guide tube 20. The sealing cartridge is therefore of generally tubular form with a tubular wall 106.

In order to put the ducts 80 and 100 into communication with each other, the tubular wall 106 of the sealing cartridge includes, in this example, a hole or passage 108 which, during fitting of the cartridge 78 in its bore 72, is disposed circumferentially in a location facing the hole 100.

The radially inner sealing gasket 86 is, as described above, mounted in axial compression between the radially inner annular end edge 88 of the cartridge 78 and the portion 90 of the outer tube 58 that surrounds the feed orifice 42.

Good sealing is thus obtained with a liner 86 of simple and inexpensive form.

In order to provide sealing of the cartridge 78 and the through hole 100 in the embodiment shown in FIGS. 2 to 5, the sealing cartridge 78 carries two O-ring seals, namely an inner seal 110 and a radially outer seal 112. Thus, the first O-ring seal 110 is mounted in a complementary groove formed in the peripheral wall of the sealing cartridge 78, and it is disposed between the hole 108 and the through hole 100 on the one hand, and the radially inner end 88 on the other hand.

The second O-ring seal 112 is also mounted in a radially internal groove of the sealing cartridge 78, and it is disposed between the hole 108 and the through hole 100 on the one hand, and the radially outer transverse end face 104 of the cartridge 78 on the other hand.

In order to retain the cartridge 78 in its fitted position in the bore 72, in which it compresses the annular sealing gasket 86, the first embodiment of the invention shown in FIGS. 2 to 5 proposes that a first shoulder 114 be formed integrally with the inlet 22.

The abutment shoulder 114 accordingly extends radially inwards with respect to the bore 72, and it is for example made by effectively radially inward plastic flow, in the direction of the axis X-X, of the corresponding radially outer portion of the inlet 22, which is initially in the form of a tubular body, so that the sealing cartridge 78 can be introduced axially into it.

The cartridge 78 can of course include means for indexing it circumferentially in the bore 72, so as to guarantee during its fitting that the hole or passage 108 is in alignment with the through hole 100. These means may be in the form of complementary profiles such as at least one projecting element on one of the components 22 or 78 penetrating into a hollow in the other component 78 or 22, or they may be simple visual indications.

Figure 6:
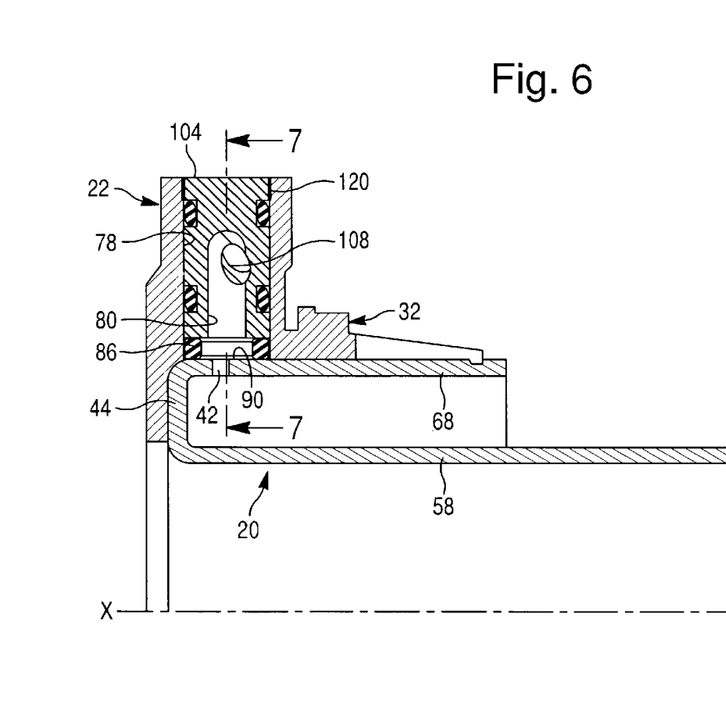
FIGS. 6 and 7, and FIGS. 8 and 9, are views similar to those in FIGS. 4 and 5, but show, respectively, a second embodiment and a third embodiment of the invention.
Figure 7:
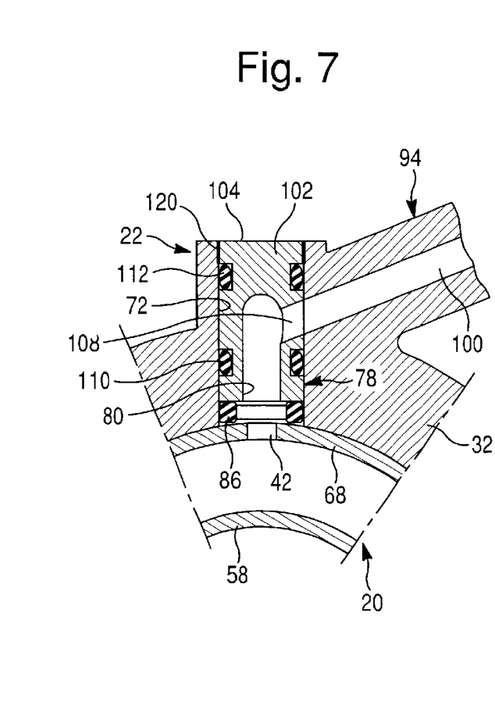

In the second embodiment shown in FIGS. 6 and 7, the general design of the device 10 and its sealing cartridge 78 are identical with those described above with reference to FIGS. 2 to 5.

The sealing cartridge 78 in this example is fixed axially in the bore 72 of the inlet 22 by seamed welding of the blind radially outer end portion 102 of the cartridge 78 within the corresponding portion of the bore 78.

In this way a sealed welding zone 120 situated above the O-ring seal 112 is created.

The weld may be obtained using ultrasonic welding or any other welding technique, with indirect application of heat such as for example infrared welding, friction welding, and so on.

The welding operation to create the sealed weld zone 120 is of course carried out while maintaining on the sealing cartridge 78 an axial force which is directed radially towards the axis X-X, so that after the welding operation is completed, the annular sealing gasket 86 is in compression.

Figure 8:
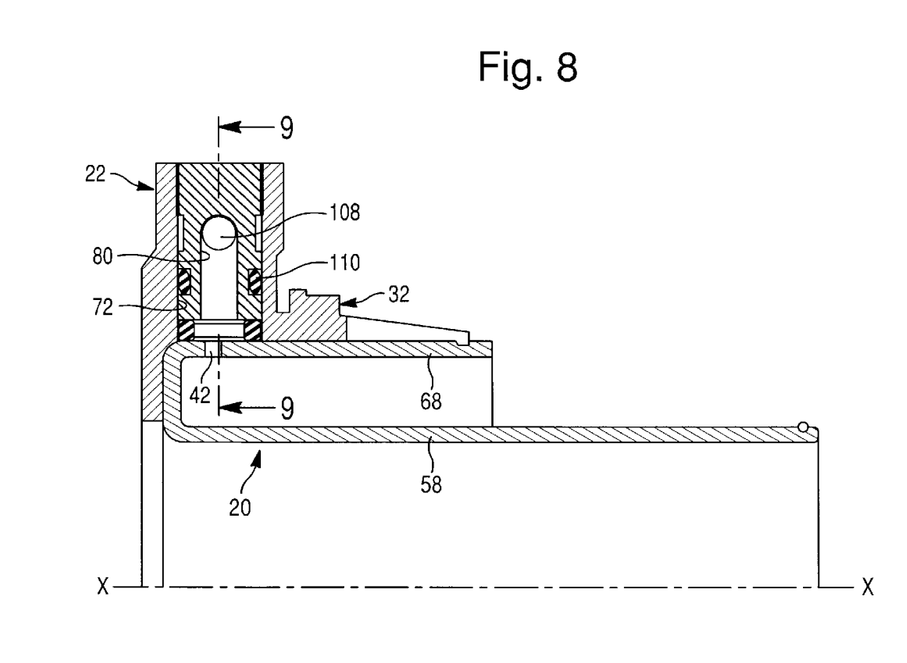
Figure 9:
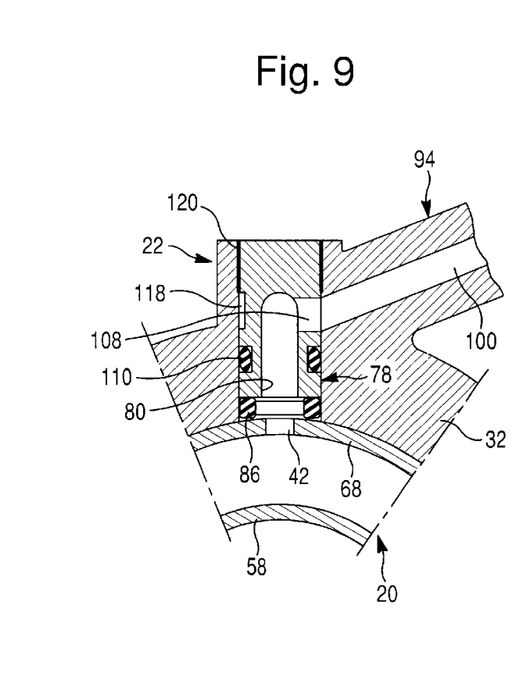

In the third embodiment shown in FIGS. 8 and 9, the sealing cartridge 78 is fixed as before by welding, but its design is slightly different.

In this connection, it carries only one O-ring seal 110, which is arranged between the annular sealing gasket 86 and the hole or passage 108, having regard to the formation of the sealed weld 120.

In order to avoid the problem of angular orientation of the sealing cartridge 78 in its bore 72, the outer peripheral surface of the cartridge 78 includes an internal radial groove 118 which is formed in line with the passage 108, which in this example is oriented diametrally.

Thus, the through hole 100 is always in line with the groove 118 which puts it into communication with the passage 108, regardless of the angular orientation of the cartridge 78.

The invention is not limited to the embodiments which have just been described.

Fastening and immobilisation of the sealing cartridge 78 in the bore 72 of the tubular inlet 22 could, in particular, be achieved by other equivalent means.

Figure 10:
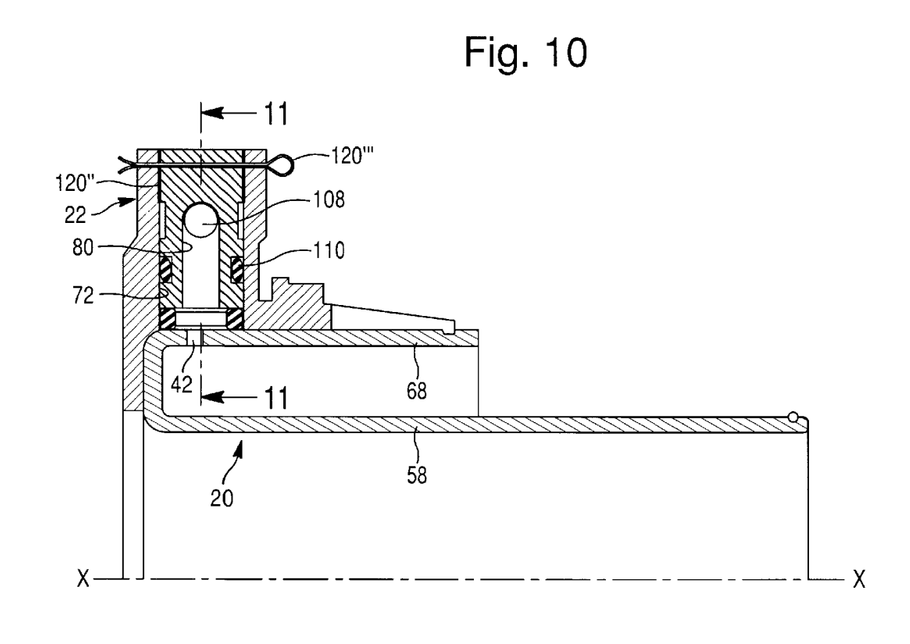
FIGS. 10 and 11 are view similar to those in FIGS. 4 and 5, but show different examples of fastening the sealing cartridge 78 in the bore 72.
Figure 11:
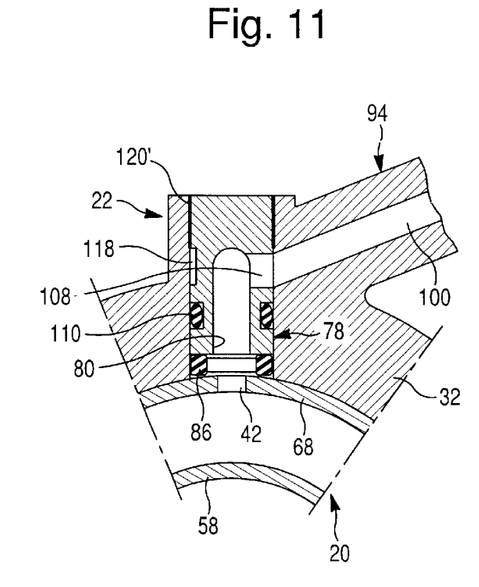

The cartridge 78 may for example be secured by screw fastening (120' in FIG. 11), adhesive bonding (120" in FIG. 10), force-fitting, binding, elastic mating engagement, or clipping, using a transverse cotter pin or the like, all such means being interposed directly between the cartridge 78 and the inlet 22, or making use of intermediate fastening elements such as resilient annular rings or circlips (120''' in FIG. 10).

The design according to the invention enables the body 32 and, in particular, the inlet 22, to be easily stripped from the mould, by simplifying the various steps in its manufacture, the various bores or through holes being formed integrally by moulding or subsequently by forming or machining operations.

By way of a modified version not shown, the cartridge 78 could also be made in several parts, and the annular sealing gasket 86 may, as in the state of the art, be made using the two-material moulding technique with the cartridge 78, or with one of the parts of the latter.

The sealing gasket 86 may of course follow the profile of the portion 90 of the outer tube 68.

In another version, the tube guide 20 is in several parts, the inner tube 58 being for example thicker than the outer tube 68. The base portion 44 can then be made integral with one or other of the two tubes 58 and 68. The tube 20 may for example be made by deep drawing.

The base portion 44 can be thicker than the rest of the tube 20. The outer tube 68 may be thicker than the inner tube 58. For more detail, reference should be made to the document WO99/66226, the tube 20 being preferably obtained by forging from a metal slug.

What is claimed is:

1. A hydraulically controlled declutching device (10) for a clutch, for acting on a clutch disengagement means, and comprising an external body (32) for fastening the declutching device on a fixed part, an axially oriented annular blind cavity (36) defined by a guide tube (20) which is delimited radially outwardly by an outer tube (68), a guiding profile of said guide tube is followed by the external body (32), and further comprising a piston (18) which penetrates into the blind cavity (36) so as to define a variable volume control chamber, wherein the outer tube (68) includes an orifice (42) for feeding fluid to the chamber, which is connected to a feed duct (26) that is in communication, with a bore (72) of the external body (32, 22) the orientation of which is generally radial and which is formed facing the feed orifice (42) of the outer tube (68), through a tubular element (78) sealingly attached to and mounted in the bore (72), wherein the radially outer end (102) of the tubular element (78) is blind, and in that the feed duct (26) is connected to a through hole (100) of the external body (32, 94) which is open transversely into the bore (72) in line with a passage (108) formed in the wall (106) of the tubular sealing element (78).

2. A device according to claim 1, wherein the tubular sealing element (78) carries at least one annular seal (110, 112) which is in cooperation with the wall of the bore (72).

3. A device according to claim 2, wherein the annular seal (110) is disposed between the said passage (108) and the radially inner end (88) of the tubular sealing element (78).

4. A device according to claim 3, wherein the tubular sealing element (78) carries a second annular seal (112) disposed between the said passage (108) and the radially outer end (102, 104) of the tubular sealing element (78).

5. A device according to claim 1, wherein an annular sealing gasket (86) is mounted in compression between the radially inner transverse annular end face (88) of the tubular sealing element (78) and a facing portion of the outer wall (90) of the outer tube (68) that surrounds the feed orifice.

6. A device according to claim 5, wherein the annular sealing gasket (86) is an element which is interposed axially between the radially inner transverse annular end face (88) of the tubular sealing element (78) and the facing portion (90) of the outer wall of the outer tube (68).

7. A device according to claim 5, wherein the annular sealing gasket (86) is made by moulding in one piece with the tubular sealing element (78).

8. A device according to claim 1, wherein said passage (108) is at least one hole formed in the wall (106) of the tubular sealing element (78).

9. A device according to claim 8, wherein the tubular sealing element (78) has an peripheral radial groove (118) into which said hole (108) is open.

10. A device according to claim 1, wherein the tubular sealing element (78) is immobilised axially in the bore (72) which receives it, by fastening means which are arranged at the radially outer end of the bore.

11. A device according to claim 10, wherein said fastening means comprise a radial abutment shoulder (114) formed within the bore, which extends facing the radially outer annular transverse axial end face (104) of the tubular sealing element (78).

12. A device according to claim 11, wherein the shoulder (114) is formed integrally with the body (32, 22) by deformation of the latter after the tubular sealing element (78) has been fitted in place.

13. A device according to claim 12, wherein the abutment shoulder is an annular ring attached within the bore.

14. A device according to claim 1, wherein the tubular sealing element (78) is immobilized axially, in the bore which receives it, by sealed welding (120) with external application of heat from its radially outer end portion into the corresponding portion of the bore (72).

15. A device according to claim 1, wherein the tubular sealing element (78) is immobilized axially, in the bore which receives it, by sealed adhesive bonding of its radially outer end portion in the corresponding portion of the bore.

16. A device according to claim 1, wherein the tubular sealing element (78) is immobilized axially, in the bore that receives it, by screw-fastening of its radially outer end portion in the corresponding portion of the bore.

17. A device according to claim 1, wherein the tubular sealing element (78) is immobilized axially by force-fitting in the bore that receives it.

18. A device according to claim 1, wherein the tubular sealing element (78) is immobilized axially, in the bore that receives it, by complementary fastening means with elastic mating engagement.

19. A device according to claim 1, wherein the tubular sealing element (78) is immobilized axially, in the bore that receives it, by complementary fastening means defining a cotter pin.

20. A device according to claim 1, wherein the body (32) is a moulded component, and in that the tubular sealing element (78) is a plastics moulding.

* * * * *